June 8, 1948. C. H. PETSKEYES 2,443,011
WEB HANDLING MEANS FOR BREAD WRAPPING MACHINES
Filed June 9, 1945 3 Sheets-Sheet 2

INVENTOR.
Charles H. Petskeyes
BY
His Attorney

June 8, 1948. C. H. PETSKEYES 2,443,011
WEB HANDLING MEANS FOR BREAD WRAPPING MACHINES
Filed June 9, 1945 3 Sheets-Sheet 3
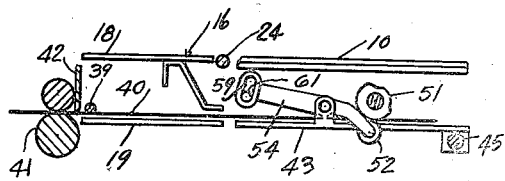
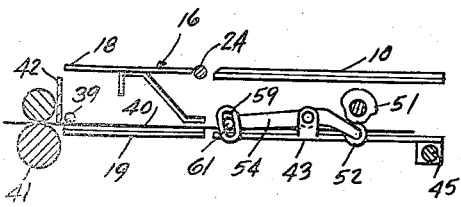
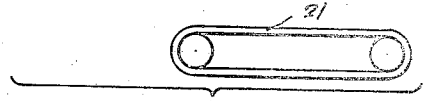
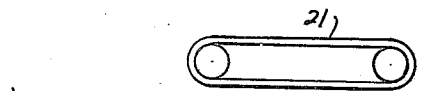
Fig. 3        Fig. 4
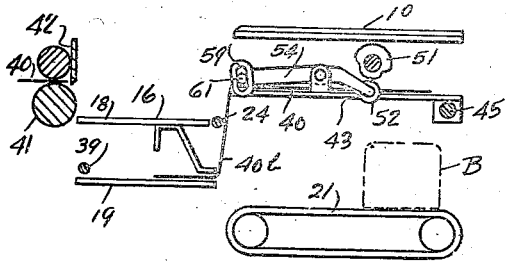
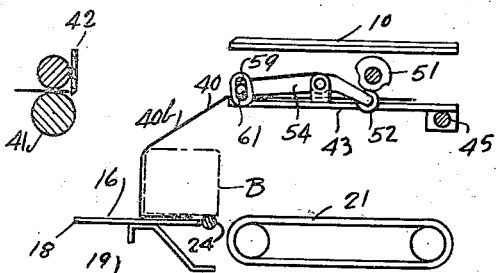
Fig. 5        Fig. 6
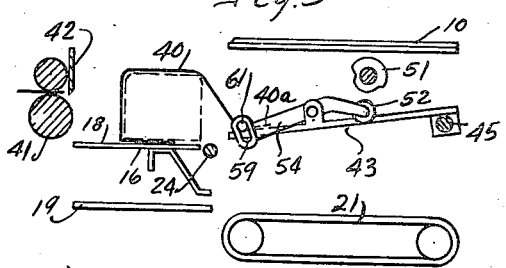
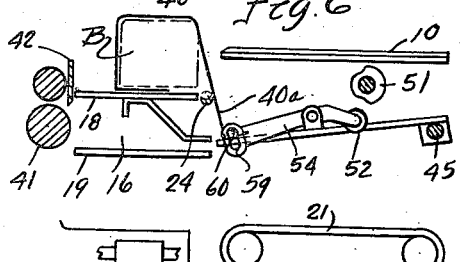
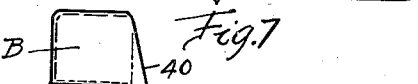
Fig. 7        Fig. 8
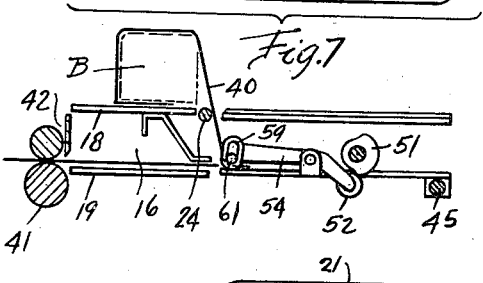
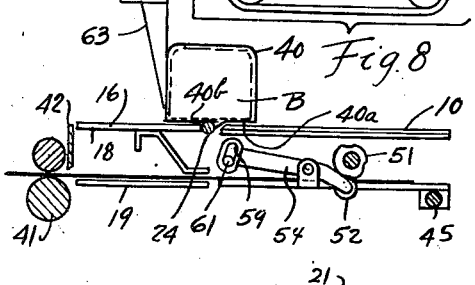
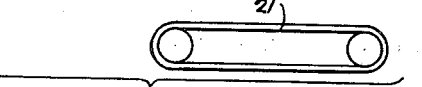
Fig. 9        Fig. 10
INVENTOR.
Charles H. Petskeyes
BY
He's Attorney Patented June 8, 1948

2,443,011

UNITED STATES PATENT OFFICE 2,443,011

WEB HANDLING MEANS FOR BREAD WRAPPING MACHINES

Charles H. Petskeyes, Davenport, Iowa, assignor to Gellman Manufacturing Company, Rock Island, Ill., a corporation of Illinois Application June 9, 1945, Serial No. 598,466

9 Claims. (Cl. 93—2)

1

This invention relates to certain novel improvements in bread wrapping machines. More particularly the invention relates to improvements in bread wrapping machines of the character disclosed in the following United States Letters Patents: 2,276,590; 2,252,028; 2,235,503; 2,232,558 and 2,230,797.

In bread wrapping machines, the loaf of bread to be wrapped is conveyed from a bread slicing machine of the type disclosed in United States Letters Patent 2,092,276, by a conveyor to an elevator from whence the sliced loaf of bread is conveyed by the elevator through the wrapping area of the machine to a higher plane, from whence the bread is conveyed through a sealing area and thence through a cooling area, the latter to permit the effective sealing of the folds of the wrapper to assure a secure and tightly wrapped loaf of sliced bread. This invention has for its provision a novel arrangement for holding and releasing a severed web of paper during partial folding of the wrapper about a sliced loaf of bread. In wrapping a sliced loaf of bread, it is desirable from the standpoint of appearance as well as appeal that the wrapper upon the bread be substantially taut and yet not taut to the extent that the sliced loaf of bread is crushed. Consequently, during the wrapping of the loaf of bread it is at times desirable that the severed paper web utilized to wrap the bread, be substantially free for folding movement and at other times be held substantially taut, to assure that the sliced loaf of bread is tightly wrapped and yet not crushed or otherwise disfigured. To this end the invention has as its object the provision of means for accomplishing the above stated accomplishments.

More particularly the present invention has, among its several objects the provision of a holding and tensioning means which cooperates with an article elevator to effectively wrap a paper web about the article while the elevator is moving from a lower level to an upper level.

Other objects will appear hereinafter.

The invention consists in the novel combination and arrangement of parts to be hereinafter described and claimed.

The invention will be best understood by reference to the accompanying drawings showing the preferred form of construction, and in which.

Figs. 3 to 10 inclusive are schematical detail

2 views illustrating the various positions of the parts during the wrapping of a sliced loaf of bread.

Only so much of the bread wrapping machine has been illustrated as is necessary for an understanding of this present invention.

In this connection the drawings illustrate the preferred form of construction by which the several objects of the invention are accomplished.

Figure 1:
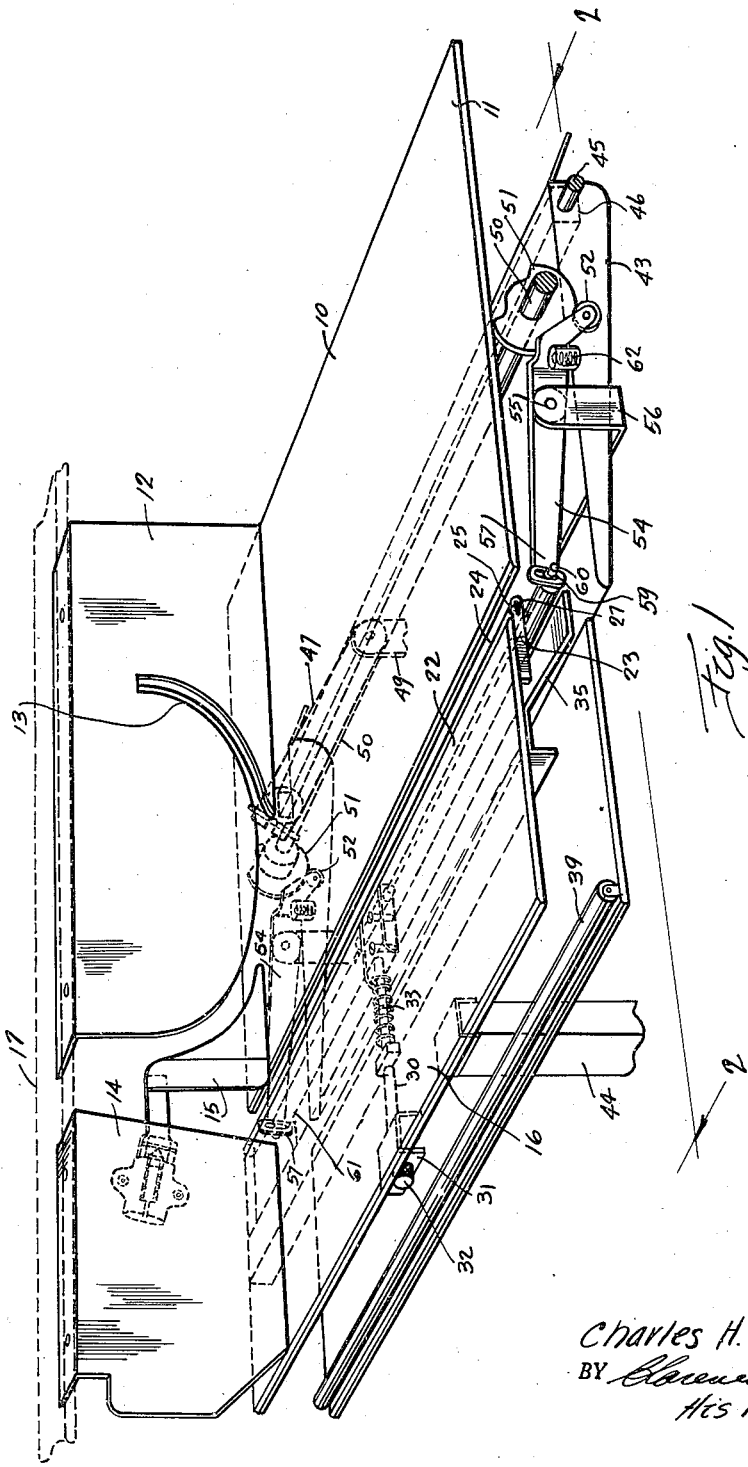
Fig. 1 is a fragmentary perspective view of a bread wrapping machine illustrating my invention associated therewith.
Figure 2:
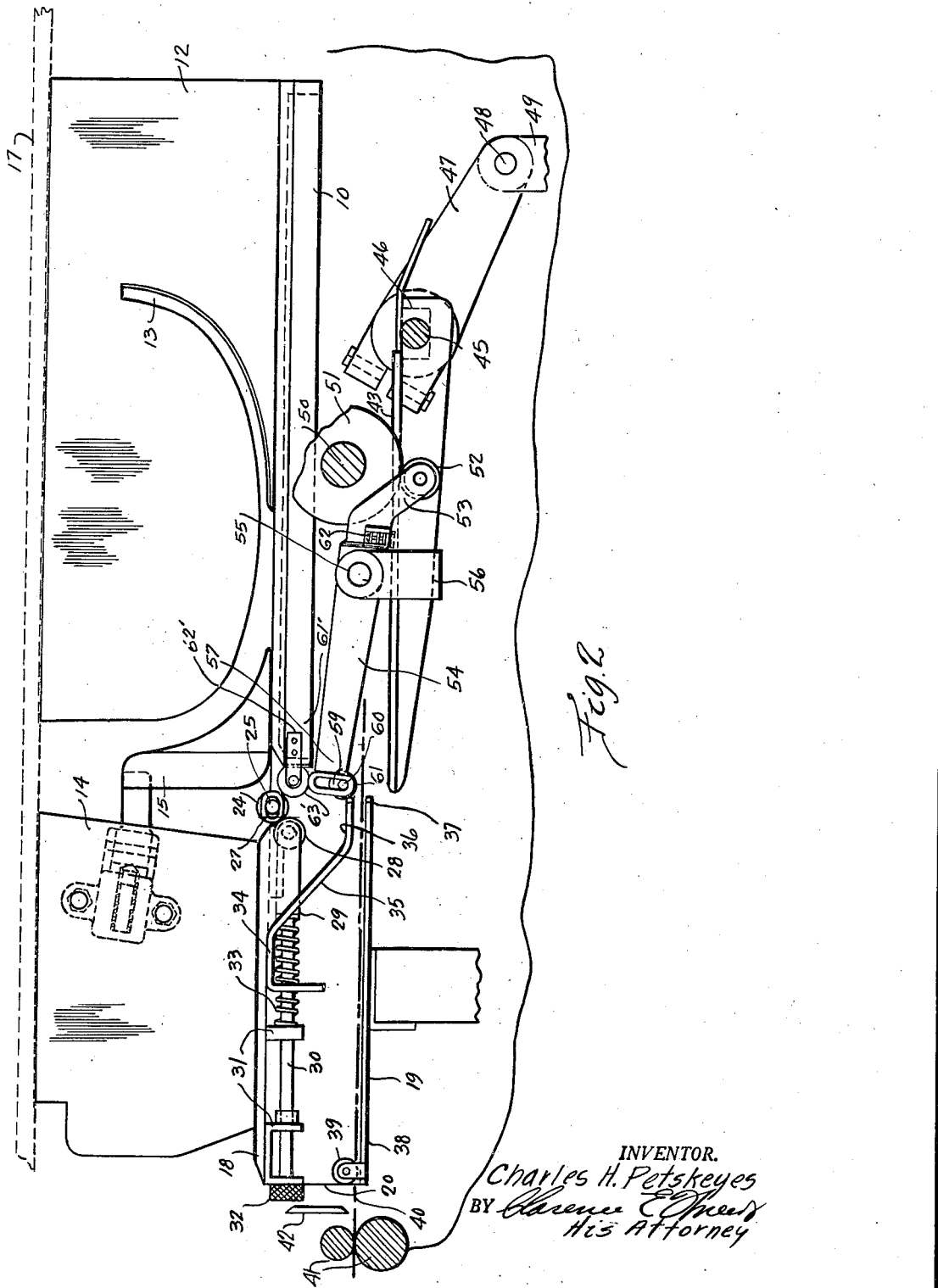
Fig. 2 is a sectional detail view of the same taken substantially on line 2—2 of Fig. 1.

Referring particularly to Figs. 1 and 2, the bread wrapping machine, as illustrated in these drawings, comprises a bed plate 10. Extending upwardly from the marginal edges 11 of this plate 10 and in spaced parallel relation with respect to each other, are final fold plates 12 having arcuated grooves 13 formed therein for receiving the projecting portions of a paper web to produce the final end folds in a manner substantially similar to that disclosed in United States Letters Patent No. 2,235,503. These plates 12 are generally heated for effectively sealing the folded members of the wrapper within which the sliced loaf of bread is wrapped. Cooperating with these final fold plates are guide plates 14 which, in the present instance, provide retaining arms 15 for holding the partially folded ends of the wrapped sliced loaves of bread during their movement from an elevator 16 to the bed plate 10 as more fully shown and described in my copending application, Serial No. 598,468, filed June 9, 1945, now matured into Patent 2,418,277, issued April 1, 1947. These plates 12 and 14 are connected in a suitable manner to the side rails 17 of the bread wrapping machine. The elevator 16 comprises a top plate 18 and a sub-plate 19 spaced from the top plate 18 by end walls 20. The top plate 18, when the elevator is in its lowermost position (a position diagrammatically illustrated in certain of Figs. 3–10), is adapted to receive a sliced loaf of bread from a conveyor 21, after which the elevator moves upwardly from the area to be presently explained.

Along the longitudinal edge 22 of the top plate 18, there is supported by end brackets 23 secured to the top plates in any approved manner, an elongated roller 24 which is adapted to engage the paper web in a manner hereinafter set forth. The trunnions 25 of this roller are journaled in the elongated slots 27 formed in the mounting brackets 23, and this roller is yieldably urged in a direction away from the longitudinal edge 22 of the top plate 18 by a pressure roller 28 which engages the roller 24 in the manner shown in Fig. 2. This pressure roller 28 is carried by a bracket 29 formed as an integral part of a shaft 30. This shaft 30 is supported by bearings 31, and has at one end a thumb nut 32. Disposed between one of the bearings 31 and the bracket 29 is a spring 33 which functions to project the roller 28 into contact with the roller 24.

Secured to the underside of the top plate 18 in any approved manner, is an elongated plate 34 having its medial portion inclined downwardly as at 35 (Fig. 2) to dispose a forward end portion 36 in a horizontal plane and in spaced relation with respect to the marginal edge portion 37 of the sub-plate 19.

Along the opposite marginal edge portion 38 of the sub-plate 19 is an elongated roller 39. Beneath this roller 39 is adapted to be projected a paper web 40 from between feeding rollers 41. Between this roller 39 and the rollers 41 is a paper severing knife 42 which substantially severs a web of paper from a roll of paper (not shown), in a manner substantially similar to that disclosed in United States Letters Patent No. 2,235,503.

From the roll of paper (not shown) the paper is passed between the feed rollers 41 and projected upon the sub-plate 19 beneath the roller 39, and should the leading edge portion of the paper curl, it will engage the inclined medial end portion 35 of the plate 34 and be directed in a horizontal plane upon a tiltable table 43, hereinafter more fully described.

To complete the elevator structure, there is associated with the sub-plate 19 a reciprocatory bar or standard 44 which by suitable mechanism (not shown) is reciprocated in a horizontal plane.

The tiltable table 43 is supported by a rocker shaft 45, the medial portion of this shaft 45 being substantially square in cross section as at 46 for attachment to the table 43.

One end portion of this shaft 45 is connected to a link 47, and this link is connected as at 48 to a rocker arm 49 in turn connected to suitable mechanism (not shown) for rocking the arm 49 so as to rock the shaft 45 and thus tilt the table 43 in a manner and for the purposes hereinafter set forth.

Extending transversely of this shaft 45 and between the table 43 and the bed plate 10 (beneath which and in spaced relation with respect to which the table 43 is located), is a rotary shaft 50 supported in suitable bearings (not shown). On opposite end portions of this shaft 50 are cams 51, and these cams 51 are adapted to engage rollers 52 rotatably carried by downwardly inclined end portions 53 of spaced arms 54. The arms 54 are pivotally supported as at 55 by brackets 56 secured in any suitable manner to the table 43.

The corresponding end portions 57 of these arms 54 are provided with enlarged portions, and these portions are provided with elongated slots 59. Mounted in these slots 59 are trunnions 60 of a roller 61 disposed between the arms 54. The roller 61 constitutes a retaining and tensioning roller for the purposes now presently to be described.

As shown in Fig. 2, the severed paper web is adapted to have a portion thereof projected upon the table 43 and retained thereon in a manner now to be described.

Figs. 3 to 10 inclusive diagrammatically illustrate the various steps in the holding of a paper web to be wrapped about a sliced loaf of bread.

In this connection, reference being had to Fig. 3, the elevator 16 is in its uppermost position, with the top plate 18 in substantially the same plane as the bed plate 10 and with the sub-plate 19 in substantially the same plane as the table 43. In this position of these parts, the paper web has been projected upon the sub-plate 19 and the table 43, and in the normal operation of the machine the cutting knife 42 is ready to sever the web 40 from the roll of paper. It will be noted, in Fig. 3, that the pressure arms 54 are so disposed as to support the pressure roller 61 substantially spaced from the table 43, to allow the paper web free movement upon the table 43. In Fig. 4 the cutting knife 42 has severed the web 40 from the paper roll and the cams 51 have rotated to a position to dispose the pressure arms 54 in a position with the pressure roller 61 resting of its own weight upon that portion of the paper web 40 disposed upon the table 43.

In Fig. 5, the elevator 16 has started its downward movement. The cam 51 is still retaining the arms 54 in a position to permit the pressure roller 61 to rest of its own weight upon the paper web 40 to tension the paper web during this downward movement of the elevator, which downward movement disposes the end portion 40b of the paper web 40 in the path of movement of the sliced loaf of bread. In this position, however, the elevator has moved down a sufficient distance to partially withdraw from the sub-plate 19 the end portion 40b of the paper web 40. Likewise with the elevator in this position, a sliced loaf of bread B is upon the conveyor 21 and is being moved in the direction of the elevator, with the end portion 40b of the paper web 40 disposed in its path of movement.

In Fig. 6, the roller 61 still bears of its own weight upon the paper web 40; the elevator 16, however, has moved down to its lowermost position, in a position where it has received from the conveyor 21 the loaf of bread B. As the loaf of bread is moved upon the elevator, it engages the portion 40b of the paper web and partially envelopes itself with this portion 40b of the paper web 40.

As the elevator moves upwardly, it is desirable to resist by tension the folding of the paper web 40 about the loaf of bread B, and this is accomplished in the manner shown diagrammatically in Fig. 7. In Fig. 7, the table 43 has been tilted, the rollers 52 have moved from engagement with the cams 51, and the arms 54 have moved with the table 43 and are pivoted downwardly by the action of springs 62 bearing against the arms 54 in the manner shown in Fig. 2. This position of the table 43 and the arms 54 yieldably bears the roller 61 upon the end portion 40a of the paper web 40, tensioning the paper web 40 as the elevator moves upwardly to the position shown in Fig. 8, during which upward movement of the elevator the paper web 40 will be drawn about the loaf of bread B substantially tight and free of any wrinkles or creases. As the elevator moves toward its upper position, as shown in Fig. 8, the end portion 40a' of the paper web 40 gradually moves to the position shown in Fig. 9, in which position the cams 51 act upon the rollers 52 to pivot arms 54 to a position where the rollers will be raised from engagement with the end portion 40a of the paper web 40. When this takes place, the elevator has completely reached its uppermost position, and in this position a follower 63 of any approved structure is moved in a direction (by any suitable mechanism) to move the sliced loaf of bread B from the elevator 16 onto the heating plate 10. During this movement the portion 40a of the paper web 40 is folded beneath the loaf of bread in overlapping relation with the opposite end portion 40b of the paper web 40.

As the loaf of bread moves from the elevator 16 to the heating plate 10 by means of the follower 63, the end folds are formed in a manner shown in United States Patent No. 2,235,503.

The movement of the elevator from the position shown in Fig. 3 to that shown in Fig. 10 is one complete cycle, and all the parts, it is to be understood, are so timed as to operate at the proper time to effect the wrapping of the web upon the loaf of bread and to move the loaf of bread in the various positions just previously described.

As shown in Fig. 2 the longitudinal edge portion 61' carries parallel with respect thereto by means of brackets 62' a roller 63' which cooperates with the roller 27 to form the final folds as demonstrated in Fig. 10. This roller is not shown in Figs. 1 and 3 to 10 inclusive but is shown in Fig. 2.

From the foregoing description, it is manifest that the above structure results in a sliced loaf of bread being wrapped within a paper web which is substantially taut about the sliced loaf of bread and which is free of wrinkles, creases or the like. The mechanism also results in a uniform wrapping of each loaf of bread.

While I have not shown or described the mechanism for operating the follower 63, it is understood that any approved mechanism may be employed such as is well-known in the art.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A paper web holding and tensioning means for use in a wrapping machine comprising a rocker shaft, a table carried by the shaft, a pressure roller extending transversely of the table along one edge portion thereof and between which roller and the table a web of paper is adapted to be projected, means for pivotally supporting said roller from said table, and cam means for pivoting said supporting means relative to said table whereby to move said roller from holding contact with said web.

2. A paper web holding and tensioning means for use in a wrapping machine comprising a rocker shaft, a table carried by the shaft, a pressure roller extending transversely of the table along one edge portion thereof and between which roller and the table a web of paper is adapted to be projected, means for pivotally supporting said roller from said table, and cam means for pivoting said supporting means relative to said table whereby to move said roller from holding contact with said web, said roller supporting means comprising portions having elongated slots formed therein and said roller having trunnions movable in said slots.

3. A paper holder and tensioning means comprising a table upon which a portion of a paper web is adapted to be projected, a pressure roller extending transversely of said table above said paper web, cam means for moving said pressure roller from holding engagement with said web, and means floatingly carrying said pressure roller whereby said roller of its own weight is adapted to rest upon said paper web, and means for bearing said roller against said paper web.

4. A paper holding and tensioning means comprising a tiltable table upon which a portion of a paper web is adapted to be projected, means for tilting said table, a pressure roller extending transversely of said table above said paper web, means carried by and movable with said table for moving said pressure roller into and from engagement with said web, said means having means whereby said roller of its own weight is adapted to rest upon said paper web.

5. A paper holding and tensioning means comprising a tiltable table upon which a portion of a paper web is adapted to be projected, means for tilting said table, a pressure roller extending transversely of said table above said web, means carried by and movable with said table for moving said pressure roller into and from engagement with said web, said last-named means having means whereby said roller of its own weight is adapted to rest upon said paper web, and means for bearing said roller against said paper web.

6. A paper holding and tensioning means comprising a tiltable table upon which a portion of a paper web is adapted to be projected, means for tilting said table, a pressure roller extending transversely of said table above said paper web, cam means, and means carried by and movable with said table and engageable with the cam means for moving said pressure roller from holding engagement with said web, said last-named means including means supporting the roller for movement transversely of said means whereby said roller of its own weight is adapted to rest upon said paper web.

7. A paper holding and tensioning means comprising a tiltable table upon which a portion of a paper web is adapted to be projected, means for tilting said table, a pressure roller extending transversely of said table above said web, cam means, and means carried by and movable with said table and engageable with the cam means for moving said pressure roller from holding engagement with said web, said last-named means including means supporting the roller for movement transversely of said means whereby said roller of its own weight is adapted to rest upon said paper web, and means for bearing said roller against said paper web.

8. In a wrapping machine, the combination with a reciprocatory elevator having a sub-plate upon which a paper web is adapted to be projected, a tiltable table adapted to receive a portion of said paper web, means for tilting said table, a pair of spaced arms pivotally carried by said tiltable table at opposite ends and having corresponding end portions provided with elongated slots, a pressure roller extending transversely and above said table and having trunnions movable in said slots, said roller adapted to engage the portion of said paper web upon said table, cam and roller means for pivoting said arms relative to said table to move said roller from holding contact with said paper web, the elongated slots of said arms permitting said roller, when said arms are pivoted in one position with respect to said table, to bear upon said paper web through its own weight and said arms, when pivoted in another position with respect to said table and when said table is tilted in one direction, to bear said roller against said paper web.

9. In a wrapping machine, the combination with a reciprocatory elevator having a sub-plate upon which a paper web is adapted to be projected, a tiltable table adapted to receive a portion of said paper web, means for tilting said table, a pair of spaced arms pivotally carried by said tiltable table at opposite ends and having corresponding end portions provided with elongated slots, a pressure roller extending transversely and above said table and having trunnions movable in said slots, said roller adapted to engage the portion of said paper web upon said table, cam and roller means for pivoting said arms relative to said table to move said roller from holding contact with said paper web, the elongated slots of said arms permitting said roller, when said arms are pivoted in one position with respect to said table, to bear upon said paper web through its own weight, and said arms, when pivoted in another position with respect to said table and when said table is tilted in one direction, to bear said roller against said paper web, and spring means cooperating with said table and said arms to bear said roller against said paper web when said table is pivoted to said position.

CHARLES H. PETSKEYES.

REFERENCES CITED

The following references are of record in the file of this patent:

UNITED STATES PATENTS

| Number | Name | Date |
| --- | --- | --- |
| 2,082,945 | Ferenci | June 8, 1937 |